US006624408B1

(12) United States Patent
Franzen
(10) Patent No.: US 6,624,408 B1
(45) Date of Patent: Sep. 23, 2003

(54) METHOD FOR LIBRARY SEARCHES AND EXTRACTION OF STRUCTURAL INFORMATION FROM DAUGHTER ION SPECTRA IN ION TRAP MASS SPECTROMETRY

(75) Inventor: Jochen Franzen, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 09/407,729

(22) Filed: Sep. 28, 1999

(30) Foreign Application Priority Data

Oct. 5, 1998 (DE) ........................................ 198 45 729

(51) Int. Cl.[7] ........................... B01D 59/44; H01J 49/00
(52) U.S. Cl. ....................................................... 250/282
(58) Field of Search .......................................... 250/282

(56) References Cited

U.S. PATENT DOCUMENTS 4,472,631 A 9/1984 Enke et al.
5,404,011 A * 4/1995 Wells et al. ................ 250/282
5,903,003 A * 5/1999 Schubert et al. ............ 250/282
6,362,473 B1 * 3/2002 Germanus ................... 250/282
6,410,913 B1 * 6/2002 Brekenfeld et al. ......... 250/282

FOREIGN PATENT DOCUMENTS

JP 10293120 A 11/1998

* cited by examiner

*Primary Examiner*—Bruce Anderson

(57) ABSTRACT

The invention relates to the scanning and representation of daughter ion spectra for the purpose of determining the structural characteristics of parent ions in ion traps. The invention consists of combining all or selected daughter and granddaughter spectra of a parent ion over several generations in one combined descendants spectrum. This combined descendants spectrum can be depicted as a graphic or a list. The references to origin can be plotted on the combined descendants spectrum. For biopolymers, where the loss of fragments can be identified due to their mass, the names or abbreviations of lost molecule fragments can be entered. The criteria for selection of the spectra can be predefined; in this way, the spectra can be depicted and even scanned automatically.

24 Claims, 1 Drawing Sheet

METHOD FOR LIBRARY SEARCHES AND EXTRACTION OF STRUCTURAL INFORMATION FROM DAUGHTER ION SPECTRA IN ION TRAP MASS SPECTROMETRY

FIELD OF INVENTION

The invention relates to the scanning and representation of daughter ion spectra for the purpose of library searching and determining the structural characteristics of parent ions in ion traps.

BACKGROUND OF THE INVENTION

Paul ion traps consist of a ring electrode supplied with high frequency and two end cap electrodes; ions can be stored inside. The ion traps can be used as mass spectrometers by ejecting the stored ions mass-selectively and scanning them with a secondary-electron multiplier. There are several different methods known for ion ejection which will not be discussed in further detail here.

Ion cyclotron resonance mass spectrometers are a different type of ion traps in which the ions can be stored in a high-constancy magnetic field and in additional electrical fields. After excitation the circular movements of the ions can be used to measure the ratio between their masses and their charges.

Ion trap mass spectrometers have special features which make their use in many types of analyses useful. In particular, selected ion types (so-called "parent ions") can be "isolated" in the ion trap (freed from all other ion types and stored alone) and fragmented with the help of a damping or collision gas by molecular collisions after excitation of their oscillating movements. This method is called "tandem in time". In high frequency quadrupole ion traps, for example, excitation occurs by applying alternating voltage of an appropriate frequency to the end caps. The spectra of these ions generated by fragmentation are known as the "daughter ion spectra" of the associated parent ions. "Granddaughter spectra" can also be scanned as fragment ion spectra of a selected daughter ion. In favorable cases, it is possible to scan such fragmentation spectra through to the tenth generation or more.

In contrast to other types of tandem mass spectrometry, particularly to "tandem in space" mass spectrometry using two mass spectrometers in series, the daughter spectra in ion traps are relatively simple for the most part. Often a daughter ion spectrum contains only a very few different types of daughter ions. The reason for this is that—particularly in a high frequency Paul ion trap—only the parent ions receive energy through resonance excitation, but none of the other ions accidentally found in the trap. Particularly, no further energy is fed to the resulting daughter ions; on the contrary, the daughter ions are cooled immediately after their formation by the ambient damping gas and can therefore usually not decompose any further. Therefore such a daughter ion spectrum usually contains relatively little information regarding the structure of the parent ion. Only in special cases are larger numbers of daughter ions formed; the requirement is that there are many equally loose binding points with almost equally low binding energies in rather large molecules. In fact, this case only occurs among larger biopolymers.

On the other hand, it is also possible to re-isolate and to fragment daughter ions in ion trap mass spectrometers and thus measure the fragment ions over several isolation and fragmentation generations. This is sometimes called $MS^n$. Although every single one of the spectra so measured provides only little information regarding the structure of the original ion, the entirety of all fragment ions does contain a large amount of structural information, particularly due to the fact that the relationships between the fragment ions are known. However, it is laborious to pick out information from a possibly enormous number of individual spectra.

In "tandem in space" mass spectrometers, daughter ion spectra are scanned in an entirely different way. Parent ions selected by the first mass spectrometer are.injected with considerable kinetic energy into a chamber with collision gas in front of the second spectrometer. About every impact transfers so much energy to the ion that it fragments. The daughters continue to fly at a barely reduced velocity and are simultaneously subjected to further collision processes with fragmentations. In this way, a "daughter ion spectrum" is produced which is a mixed spectrum of actual daughter ions mixed with granddaughter ions and great-granddaughter ions from several generations and several branches. Actually, this mixed spectrum contains a great deal of structural information. However, this information is also difficult to extract, this time due to the fact that the relationships between the fragment ions are unknown. It is no longer possible to tell from a fragment ion whether it was formed directly from the parent ion, indirectly from another fragment ion or in an even more complicated way. In the classical way of mass spectrometry, tedious experiments with isotopically marked molecules were necessary to get the wanted structural information.

Objective of the invention

It is the objective of the invention to find a technique to ease library searches in daughter, granddaughter and great-granddaughter spectra for the identification of a substance, and to facilitate the extraction of structural information on parent ions in an easier way then to look through a large number of fragment ion spectra.

SUMMARY OF THE INVENTION

It is the basic idea of the invention to display the various ion types which are scanned in the fragment ion spectra of various isolation and fragmentation generations, in one single common "combined descendant spectrum" of a progenitor ion. In this way, a spectrum is produced which corresponds far more closely to a daughter spectrum from other types of tandem mass spectrometry, at least with respect to the masses appearing in the spectrum. Libraries of MS/MS spectra obtained with tandem-in-space mass spectrometers, can be used to identify substances. Most of the search programs are written in such a manner that utmost weight is put on the appearance of masses, not on their intensities. Even if there are no MS/MS libraries for tandem-in-space spectra, library searches are much easier in libraries with combined descendant spectra than with a bundle of related $MS^n$ spectra.

For the intensity ratios of individual fragment ion types from various origins among each other, special conventions must be made, although the display primarily serves the purpose of structural determination and library identification of the progenitor ion type thus analyzed, and in these cases the intensities are generally less important.

The combined descendant spectrum can be either presented graphically, or as a list with masses and intensities of the ion types. In the former case the intensities of ion types are usually plotted as vertical lines on a horizontal mass scale ("bar graph spectrum").

It is a further idea of the invention to designate the relationships among the ions in the spectrum. For example, in a spectrum list the mass differences from the direct parent ion (predecessor ion) can be entered in a third column in addition to masses and intensities. In a graphically displayed bar graph spectrum, the relationships can be incorporated in the same way as a design drawing is dimensioned, and mass differences can also be indicated. The quantity and quality of information in such spectra far surpasses that of daughter spectra from other types of tandem mass spectrometry. The mass differences of the relationships can also be used for improving library searches, e.g. by consideration of these differences in a matching score which characterizes the quality of a match.

In a further configuration of the invention, the names or abbreviations of lost neutral fragments can be directly plotted into the spectrum instead of the mass differences. Particularly in the case of biopolymers such as proteins or oligonucleotides, the structure is made up of a linear chain of entities (building blocks) and the ions are fragmented following this pattern according to relatively simple rules. The masses of the entities are known precisely: for proteins it is the masses of the twenty amino acids, for oligonucleotides of the four nucleotides (bases).

Using a list with the dimensions and names of these entities, series of losses of entities in the descendants spectrum can be identified directly.

In the combined descendants spectrum, either all measured ion types from the fragment ion spectra can be plotted, or only selected ion types. For purposes of convenience, selection is conducted according to previously specified criteria which can be defined, for example, via intensity thresholds or via mass thresholds of mass differences from the predecessor ion. In the latter case, biopolymer sequences can be made obvious with particular ease.

Rather than selecting ion types according to the criteria at the time the combined descendants spectrum is formed, it can also be done already at the time of measurement. For example, with appropriately defined criteria, only the fragment ion spectra of those fragment ions need be scanned which have a mass interval from their predecessor ion beneath a threshold. Automatic selection at this point in time permits automatic scanning of all these fragment ion spectra.

PARTICULARLY FAVORABLE EMBODIMENTS

Figure 1:
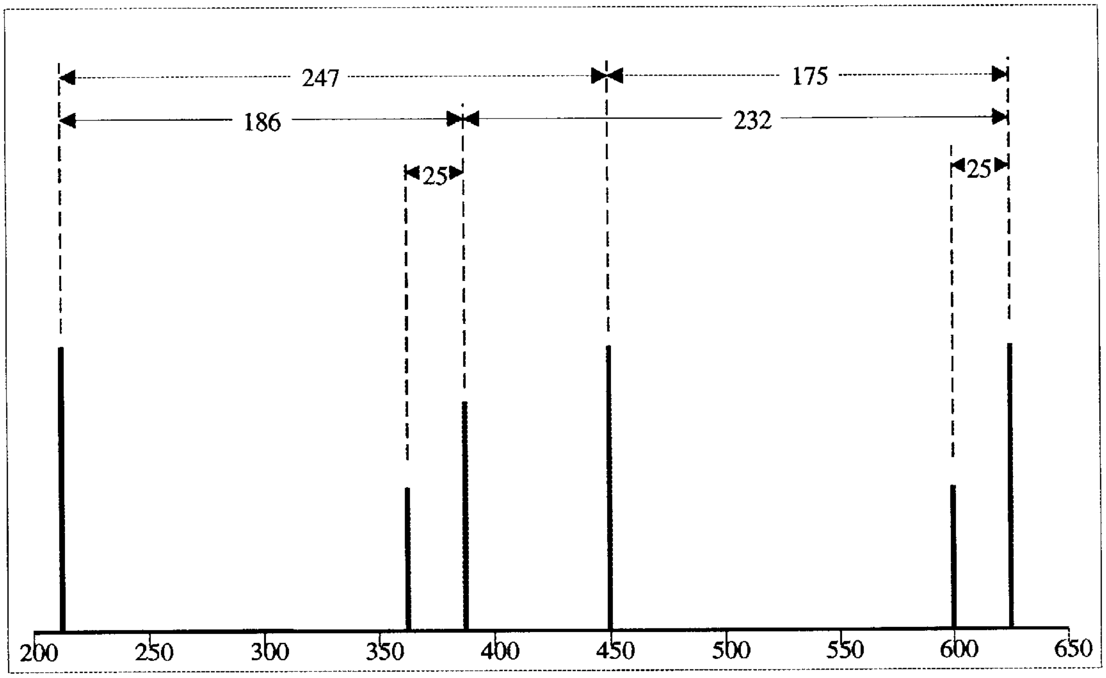
FIG. 1 shows a combined descendants spectrum containing fragment ion peaks from a total of three fragment ion spectra. It is a synthetic spectrum which is limited to a few fragment ion spectra for the sake of clarity. The parent ion peak of the mass 625 u supplies daughter ions with masses of 600, 450 and 392 u in its fragment ion spectrum. On the other hand, ions with the mass 208 u are supplied by two ion types by means of two different fragment spectra: from daughter ions with a mass of 450 u and from daughter ions with a mass of 392 u. Two of the peaks in this synthetic spectrum each demonstrate a loss of 25 u. (As every specialist knows, a loss of this mass is impossible in reality).

In FIG. 1, an (artificial) graphic representation is given of a combined descendants spectrum for descendent ion types of a progenitor ion according to this invention. The following arrangement was made for the intensities in this case: The most intensive ion in the fragment ion spectrum is equated to the intensity of the direct predecessor ion, and the other ions from the same fragment ion spectrum are plotted at the measured ratio. There is a certain arbitrariness to this definition, however it has proven useful. Instead, the sum of the fragment ions from a fragment ion spectrum could have been equated to the intensity of the predecessor ion; however in this case the intensities drop too extremely after increasing numbers of generations. If the intensities are not of interest at all, all intensities can basically be viewed as equal, and they then create no confusion regarding the possible reasons for any differences in intensity.

The spectrum in FIG. 1 expresses a combined descendants spectrum from an unknown substance. The relationships of fragment ions to one another are noted using dimensioning symbols. The annotations indicate the mass intervals in atomic mass units.

The combined descendants spectrum can be used for identification of substances in either libraries of MS/MS spectra from tandem-in-space mass spectrometers, or in a particular library of combined descendant spectra. The library search algorithm becomes much easier if the search is performed by comparing combined descendants spectrum each than by comparing a bundle of related daughter, granddaughter, and great-granddaughter spectra including all aunt and niece spectra of the family.

For a peptide ion spectrum, neutral fragment losses can be identified directly as amino acids within the spectrum and the abbreviations of the amino acids can be plotted directly on the spectrum if the program only has a list of all amino acid masses. In such spectra, sometimes losses of very light neutral fragments occur, for example with a mass of 17 u ($NH_3$) and 18 u ($H_2O$). If the identification list also contains designations for these eliminations, these designations can also be plotted.

A selection of ion types was made in the spectrum in FIG. 1 which represents only those ion types that have no great distance from the direct predecessor ion in their masses. In this way, representation is simplified, and only losses from neutral fragments are shown which correspond to simple amino acids. However, the eliminations may originate from both ends of the linear predecessor ion. A trained interpreter immediately recognizes the sequence. The sequence can however be automatically created by using a suitably intelligent algorithm. These selection criteria may however also lead to interruptions in the presentation if only one loss of an amino acid pair is present, for example, and not a loss of the individual amino acid. The criteria must therefore be used with appropriate caution.

To the same extent, of course, a sequence from an oligonucleotide can also be presented. With fragmentation, the parent ion charge also plays a role. Clean and easily interpretable structure information is only available when fragmenting singly or doubly charged ions. With a well resolved spectrum, it is easy to establish the charge state from the interval of signals within the isotope pattern.

This presentation of applications for the invention is not exhaustive. The specialist will however easily be able to adjust the basic ideas of the invention indicated here to his own special requirements.

What is claimed is:

1. Method for the generation of an ion spectrum of a substance obtained by an ion trap mass spectrometer, the spectrum being usable for substance identification during searching of a fragment spectrum library, the method comprising:

acquiring a primary spectrum from the substance with the spectrometer;

selecting ions from the primary spectrum and acquiring fragment ion spectra from the selected ions; and combining mass peaks from the primary ion spectra and from the fragment ion spectra to form a single combined descendant mass spectrum.

2. Method according to claim 1, wherein all of the fragment ion spectra are included in the combined descendant spectrum.

3. Method according to claim 1, wherein only a portion of the ions of the acquired fragment ion spectra are included in the combined descendant spectrum.

4. Method according to claim 3, wherein said portion of the acquired fragment spectra to be included in the combined descendant spectrum is chosen according to predetermined selection criteria.

5. Method according to claim 4, wherein said portion of the acquired fragment spectra to be included in the combined descendant spectrum is chosen using a selection routine run by a data processor.

6. Method according to claim 5, wherein the data processor applies an automatic scanning of fragment ion spectra during said selection routine.

7. Method according to claim 4, wherein said selection criteria comprise an intensity threshold of an ion peak relative to a parent ion peak of an immediately previous generation.

8. Method according to claim 4, wherein said selection criteria comprise a difference in mass of an ion relative to a parent ion of an immediately previous generation.

9. Method according to claim 1, wherein lineage relationships between ions of different fragmentation generations are indicated in the combined descendant spectrum.

10. Method according to claim 1, wherein intensities of all ion types in the descendant mass spectrum are indicated as being equally high.

11. Method according to claim 1, wherein a ratio of intensities of ion types from a given fragment ion spectrum are maintained in the combined descendant spectrum.

12. Method according to claim 11, wherein intensities of fragment ion types from a given fragment ion spectrum add up to an intensity of a parent ion of an immediately previous generation.

13. Method according to claim 11, wherein a maximum intensity of fragment ion types from a given fragment ion spectrum is equal to an intensity of a parent ion of an immediately previous generation.

14. Method according to claim 1, wherein acquiring fragment ion spectra comprises acquiring spectra from a fragment of a fragment of the primary ion.

15. A data library for the identification of substances using mass spectrometric spectra, the library comprising a storage medium in which is stored a plurality of combined descendant spectra of molecular ions, each descendant spectrum including spectral peaks from a plurality of separately acquired spectra of different fragment generations resulting from the fragmentation of a progenitor ion and the measurement in an ion trap mass spectrometer of spectral data at each of the fragment generations.

16. A library according to claim 15 wherein the spectral peaks depicted in a descendant spectrum are limited to those that satisfy at least one predetermined criterion.

17. A library according to claim 16 wherein said predetermined criterion is an intensity level.

18. A library according to claim 16 wherein said predetermined criterion is that the ions represented by the spectral peaks included in a descendant spectrum do not exceed a maximum difference in mass from a parent ion of an immediately previous generation.

19. A library according to claim 15 wherein the spectral peaks included in a descendant spectrum are represented as having equal intensity.

20. A library according to claim 15 wherein spectral peaks in a descendant spectrum that originate from a common fragmentation spectrum have a relative intensity to one another that is proportional to a relative intensity between them in the common fragmentation spectrum.

21. A library according to claim 15 wherein the spectral peaks in a descendant spectrum that originate from a common fragmentation spectrum have a total intensity equal to an intensity level of a respective parent ion of the common fragmentation spectrum.

22. A library according to claim 15 wherein the spectral peaks in a descendant spectrum that originate from a common fragmentation spectrum have a maximum intensity equal to an intensity level of a respective parent ion of the common fragmentation spectrum.

23. A library according to claim 15 wherein the library includes an indication of the lineage of ions represented by the spectral peaks of the descendant spectra.

24. A method of identifying a substance using mass spectrometry, the method comprising:

acquiring a mass spectrometric substance spectrum from the substance that includes spectral data from multiple fragmentation generations; and comparing the substance spectrum to a library of descendant spectra of molecular ions, each descendant spectrum including spectral peaks from a plurality of separately acquired spectra of different fragment generations resulting from the fragmentation of a progenitor ion and the measurement in an ion trap mass spectrometer of spectral data at each of the fragment generations.

* * * * *